US012273064B2

(12) United States Patent
Mahdavi et al.

(10) Patent No.: US 12,273,064 B2
(45) Date of Patent: Apr. 8, 2025

(54) ELECTRICAL DRIVE SYSTEM FOR A WORK MACHINE HAVING TWO ELECTRIC MOTORS THAT CAN BE REGULATED INDEPENDENTLY OF ONE ANOTHER

(71) Applicant: Liebherr-Elektronik GmbH, Lindau (DE)

(72) Inventors: Nejat Mahdavi, Lindau (DE); Alfred Engler, Wangen (DE)

(73) Assignee: LIEBHERR-ELEKTRONIK GMBH, Lindau (DE)

( * ) Notice: Subject to any disclaimer, the term of this patent is extended or adjusted under 35 U.S.C. 154(b) by 225 days.

(21) Appl. No.: 18/056,662

(22) Filed: Nov. 17, 2022

(65) Prior Publication Data
US 2023/0163703 A1    May 25, 2023

(30) Foreign Application Priority Data

Nov. 25, 2021    (DE) .................. 10 2021 130 987.5

(51) Int. Cl.
*H02P 6/28*    (2016.01)
*H02P 5/68*    (2006.01)
(52) U.S. Cl.
CPC ..................... *H02P 5/68* (2013.01)
(58) Field of Classification Search
CPC ..................... H02P 5/68; H02P 5/74
See application file for complete search history.

(56) References Cited

U.S. PATENT DOCUMENTS

| 11,418,130 | B2* | 8/2022 | Li .......... H02M 1/143 |
| 2006/0192518 | A1* | 8/2006 | Adra .......... H02P 25/092 |
| | | | 318/701 |
| 2010/0244850 | A1 | 9/2010 | Yano et al. |
| 2012/0326671 | A1 | 12/2012 | Krause |
| 2015/0283911 | A1* | 10/2015 | Ambrosio ........... B60L 50/40 |
| | | | 307/10.1 |
| 2020/0112281 | A1* | 4/2020 | Ziegltrum ........... B60L 15/007 |

(Continued)

FOREIGN PATENT DOCUMENTS

| DE | 102005021722 A1 | 5/2006 |
| DE | 102007024567 A1 | 11/2008 |
| DE | 102014008848 A1 | 12/2014 |

(Continued)

OTHER PUBLICATIONS

Pan, L. et al., "A High Power Density Integrated Charger for Electric Vehicles with Active Ripple Compensation," Mathematical Problems in Engineering, vol. 2015, No. 918296, Nov. 17, 2015, 19 pages.

(Continued)

*Primary Examiner* — Muhammad S Islam
(74) *Attorney, Agent, or Firm* — McCoy Russell LLP

(57) ABSTRACT

The disclosure relates to an electrical drive system for a work machine, in particular a mining truck, having at least two electrical drive motors that can each be regulated independently of one another via an associated inverter, wherein the drive system has a DC voltage power supply for the energy supply of the at least two drive motors, characterized in that at least one voltage divider is arranged in parallel with the DC voltage power supply whose partial voltages can be provided at the DC voltage inputs of the at least two inverters.

16 Claims, 5 Drawing Sheets

(56) References Cited

U.S. PATENT DOCUMENTS

2020/0156483 A1    5/2020  Kaneko et al.

FOREIGN PATENT DOCUMENTS

| DE | 112012002826 B4 | 8/2016 |
| DE | 102018200257 A1 | 7/2019 |

OTHER PUBLICATIONS

Heydari, M., "A Novel Dual-Output Six-Switch Three-Phase Inverter," Proceedings of the IECON 2011—37th Annual Conference of the IEEE Industrial Electronics Society, Nov. 7, 2011, Melbourne, VIC, Australia, 7 pages.

* cited by examiner

ELECTRICAL DRIVE SYSTEM FOR A WORK MACHINE HAVING TWO ELECTRIC MOTORS THAT CAN BE REGULATED INDEPENDENTLY OF ONE ANOTHER

CROSS REFERENCE TO RELATED APPLICATION

The present application claims priority to German Patent Application No. 10 2021 130 987.5 filed on Nov. 25, 2021. The entire contents of the above-listed application are hereby incorporated by reference for all purposes.

TECHNICAL FIELD

The disclosure relates to an electrical drive system for an electrical work machine, in particular for a mining truck, having at least two electrical drive motors that can each be regulated via an associated inverter, wherein the drive system has a DC voltage power supply for the energy supply of the at least two drive motors.

BACKGROUND AND SUMMARY

Electrification and the reduction of polluting emissions are a big topic with work machines. The provision of electrical energy is complex, in particular with large mobile work machines having high power requirements. In mining, for example, electrical overhead lines are already being installed along possible transport roadways between loading and unloading sites to supply large work machines such as mining trucks with the required electrical energy for the traction drive via the overhead line. The overhead lines provide a DC voltage having a constant voltage level. The internal power electronics of the electrical drive system of the work machines is adapted to the specified DC voltage level of the overhead line.

As the energy consumption of the vehicles increases and in particular as the distance between the loading and unloading sites increases, the rated voltage of the energy supply system tends to have to be increased in the near future to be able to compensate the increasing electrical transmission losses caused thereby. An increase in the rated voltage of the overhead line has the result, however, that existing work machines are no longer compatible with the overhead line system. The power electronics and the electric motors (or drive systems) of the work machines accordingly have to be redeveloped and replaced, which means substantial effort and costs.

An alternative solution is therefore being looked for to also be able to continue to operate the previous drive systems that were dimensioned for a smaller voltage level, also for the operation at an overhead line with a higher voltage level, without a complete replacement of the drive systems being necessary.

This object is achieved by an electrical drive system having the features of claim 1. Advantageous embodiments of the drive system are the subject of the dependent claims. In addition, the disclosure extends to a work machine having such a drive system and to a method of operating an electrical drive system for a work machine.

It is proposed in accordance with the disclosure to connect at least one voltage divider in parallel with the DC voltage power supply. The mains voltage provided via the power supply is divided in a defined ratio by means of the voltage divider. At the output side of the voltage divider, two or more partial voltages are provided each having a reduced voltage level in comparison with the mains voltage. The reduced partial voltages are applied to the DC voltage input of the respective inverter. The partial voltages ideally correspond to the respective rated voltage of the inverter.

The use of existing inverters or electric motors that are adapted to a smaller rated voltage is also possible at a power supply having a higher voltage level due to the disclosure with an integrated voltage divider. The only condition can be seen as the rated voltage of the respective inverter having to be larger than or equal to the applied partial voltage.

In the ideal case, the voltage divider at least theoretically effects a symmetrical voltage division. However, voltage fluctuations occur due to the different load behavior of the at least two drive motors (e.g. when cornering) so that no continuous symmetrical voltage division is present. The electrical drive motors may be asynchronous motors; the inverters connected upstream generate a three phase AC voltage or a three phase AC current from the DC voltage at the input side. Provision can be made that the at least two inverters of the at least two drive motors can be controlled or regulated independently of one another, i.e. the torque and/or the speed of the at least two drive motors can be set or regulated independently of one another and/or there is no mutual influence of the regulations.

The electrical drive system can be a traction drive system for a work machine, in particular a mining truck, with the respective drive motors optionally being used to drive independent axles or wheels. The drive system at the deployment site of the work machine can tap a supply voltage from an external DC voltage source via the DC voltage power supply. The external DC voltage source is optionally an overhead line system; the power supply of the drive system is implemented by means of at least one current collector. An alternative connection by means of cable is equally conceivable.

Provision can be made in an embodiment that at least one energy store is provided per drive motor or inverter. This at least one energy store is to be understood as an energy store in addition to the intermediate circuit capacitor. The required energy for the operation of the drive motors can be at least temporarily provided to the associated electric motor from the energy store. A parallel supply of the respective drive motor via the power supply and the engaged at least one energy store is also conceivable. In accordance with an embodiment, the energy store also serves the storage of the recovered energy of the drive motor working in generator mode. A charging of the energy store via the power supply is equally conceivable.

The at least one energy store can be designed as a battery bank. The use of at least one fuel cell stack having a hydrogen container as the energy store is also conceivable.

At least one or the at least two energy stores is/are sensibly each connected to the voltage divider and/or to the inverter of the associated drive motor via a bidirectional DC voltage converter (DC-to-DC converter). The bidirectional DC-to-DC converter or converters optionally serves/serve the provision of the required energy for the traction drives from the at least two energy stores. This in particular applies to deployment areas, for example driven distances without an external power supply, for example routes without overhead lines. The DC-to-DC converters here optionally work as boost converters.

The bidirectional DC-to-DC converters optionally also serve the charging of the respective energy stores from the DC voltage power supply and/or via the drive motors working as generators. The DC-to-DC converters here optionally work as buck converters.

The DC-to-DC converters used can also be used with a suitable control to balance the generated partial voltages at the output of the voltage divider when the work machine or the drive system is supplied with energy via the DC voltage power supply. A suitable regulation of the energy flow from or into the energy store compensates deviations of the partial voltages so that symmetrical voltage ratios can be supplied to the input of the inverters as the end result.

It is likewise possible for the at least two energy stores to be interchangeably connected to one another via a charge balancing means. Such a charge balancing means can optionally be implemented by a further bidirectional DC-to-DC converter whose connectors are connected to at least two energy stores. The charge balancing means allows a charge balance between the at least two energy stores. The charge balancing means can in particular be used on an exclusive supply of the drive motors from the energy stores, i.e. during operating times without an external supply via the DC voltage power supply. The charge balancing means can achieve a balancing of the partial voltages on the voltage divider by an additional charge balance between the two energy stores for this case. The aforesaid bidirectional DC-to-DC converters associated with the energy stores are controlled to set the corresponding voltages U1 and U2. The resulting energy flow (current) in the drive trains to the individual drive motors results from the load of the individual drive trains. A charge balancing means, i.e. an additional bidirectional DC-to-DC converter therefore has to be used for the balancing of the charges of the energy stores, said additional DC-to-DC converter being able to be designed as smaller in power than the two bidirectional DC-to-DC converters associated with the energy stores.

The voltage divider itself can comprise a series connection of at least two impedances Z1 and Z2 connected in parallel with the power supply, with each impedance optionally comprising a parallel connection of at least one capacitor and at least one resistor. The DC voltage provided per drive motor is then tapped above a portion of the impedances.

As has already been indicated above, the energy stores can provide energy in support of the power supply by means of the DC-to-DC converters. A balancing or another desired adaptation of the partial voltages of the voltage divider at the output side, i.e. the input voltage at the inverter, can thereby also take place by a suitable control of the DC-to-DC converters associated with the energy stores. Against this background, a separate balancing device of the voltage divider can be dispensed with if the drive system is supplied with energy via the DC voltage power supply. However, there is nothing to contradict providing at least one additional voltage balancing device instead of or in addition to the energy stores and/or associated DC-to-DC converters and/or charge balancing means to balance the partial voltages of the voltage divider provided at the output side. The additional voltage balancing device can be active or passive.

Each drive motor can additionally be connectable in parallel to a braking resistor to convert the recovered power into thermal energy. Such a brake resistor can optionally be temporarily engaged so that a conversion into thermal energy is only carried out under certain circumstances. Since the recovered energy primarily serves the charging of the energy stores or is fed into the external network, the respective brake resistor can be dimensioned as considerably smaller since only a small residual portion, if any, of the recovered energy has to be eliminated via the resistor.

The drive system is optionally equipped with a control unit to control the individual components of the drive system in dependence on certain actual and desired values. The inverters and/or bidirectional DC-to-DC converters and the charge balancing means and/or an optional active balancing device of the voltage divider can be controlled, for example. The voltage level of the power supply and/or the levels of the generated partial voltages of the voltage divider and/or one or more values of the drive motors characteristic for the drive such as the actual speed of the drive motors, and/or the power consumption of the drive motors and/or temperature values of the drive motors, and/or the charge state of the energy stores are, for example, supplied to the control unit as possible actual values. The control unit generates suitable control variables for the inverters and/or DC-to-DC converters and/or the charge balancing means in dependence on certain desired specifications, for example the required desired motor power, in particular the desired torque and the desired speed, and/or a desired braking demand. A control variable can equally be generated for activating or deactivating the braking resistor and a corresponding desired value can be generated for the control of the balancing device arranged at the input for the balancing of the partial voltages.

It is possible here that the DC-to-DC converters associated with the energy stores be controlled in dependence on the measured partial voltages of the voltage divider to be able to compensate possible deviations between the partial voltages by a suitable control of the DC-to-DC converters from the energy stores.

In addition to the drive system in accordance with the disclosure, the disclosure equally relates to a work machine, in particular a mining truck, having a drive system in accordance with the disclosure so that the same advantages and properties result for the work machine as were already shown above with reference to the drive system in accordance with the disclosure.

The at least two drive motors of the drive system here optionally serve the drive of separate wheels of the work machine. The work machine moreover comprises at least one current collector for electrically contacting an external DC voltage source, in particular an overhead line. Provision can be made here that the work machine can selectively be supplied with the required energy for the traction drive via the overhead line or alternatively via the internal energy stores. In the ideal case, the total work machine is emission free, i.e. it does not comprise any internal combustion engine for the implementation of the traction drive or any other drives of the work machine.

Finally, the disclosure relates to a method of operating an electrical drive system for a work machine, in particular an electrical drive system in accordance with the present disclosure. It is proposed in accordance with the disclosure to split the mains voltage applied to the power supply of the drive system to partial voltages by a use of a voltage divider so that independent electrical drive trains of the drive system can be supplied with a reduced voltage level.

BRIEF DESCRIPTION OF THE FIGURES

Further advantages and properties of the disclosure will be explained in more detail in the following with reference to the embodiments shown in the Figures. There are shown.

DETAILED DESCRIPTION

Figure 1:
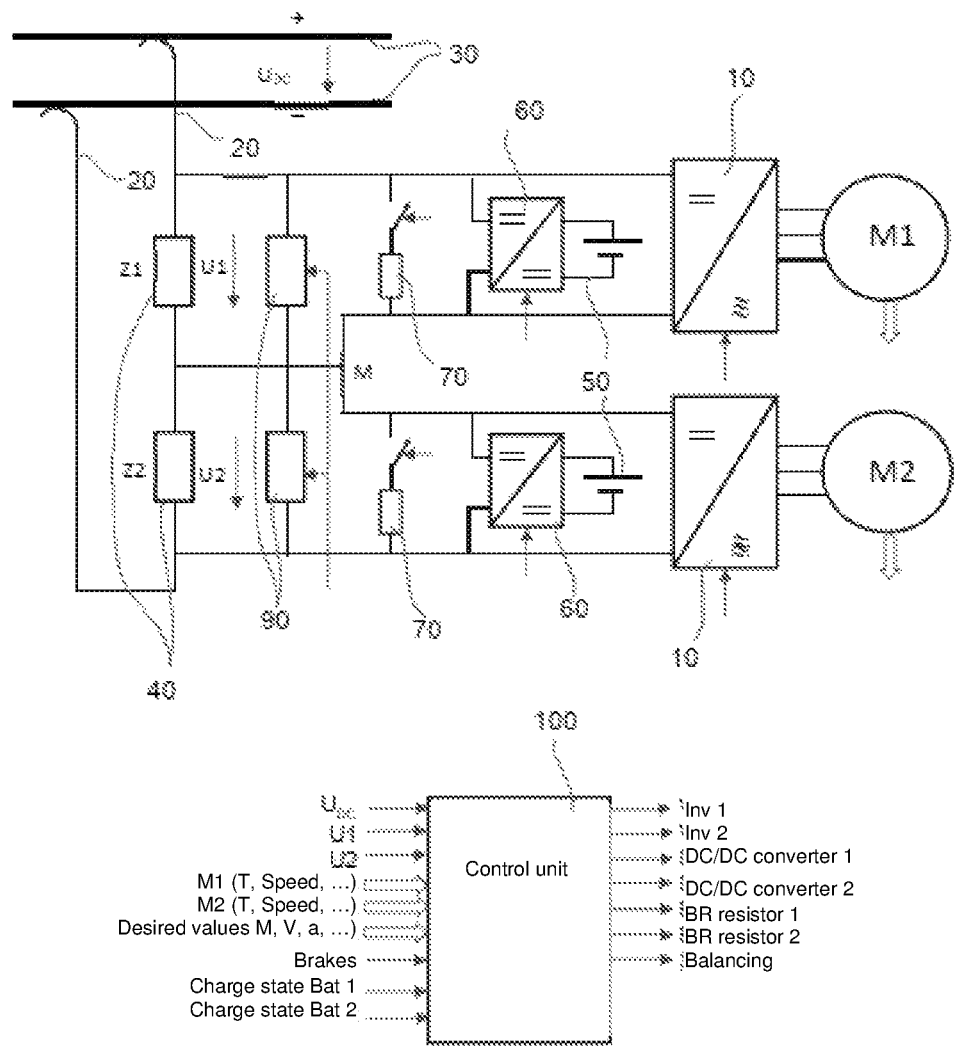
FIG. 1: a circuit diagram of the electrical drive system in accordance with the disclosure for a mining truck having a voltage divider comprising two identical impedances Z1 and Z2, a conventional balancing device, and two separate storage systems.

FIG. 1 now shows the schematic design of the drive system in accordance with the disclosure for a mining truck. The traction drive of such a mining truck is by electric motor, i.e. at least the two rear wheels of such a mining truck can be driven by separate electric motors, here the motors M1 and M2. The two motors M1 and M2 are typically asynchronous motors that are fed via a three phase DC voltage.

The drive motors M1, M2 are components of two independent electrical drive trains that each comprise an inverter 10 that is connected upstream of the drive motor M1, M2 and that converts the DC voltage applied at the input side into the required three phase AC voltage for the motors M1, M2. In addition to this, a battery bank 50 is provided per drive train that is connected to the DC voltage intermediate circuit via an associated DC-to-DC converter 60.

The deployment site of such mining trucks is often in large landmines to transport large amounts of the removed soil from a loading site to an unloading site. Overhead line systems 30 that provide a DC voltage having a constant potential $U_{DC}$ along the course of the lines are installed along the transport roadway for the required energy supply. The mining truck can tap the DC voltage potential $U_{DC}$ by means of the current collectors installed at the mining truck and can use it for the energy supply of the drive system.

Due to the increasing transport roadways and the increasing power consumption of the machines, it is desirable to raise the voltage potential due to impending power losses.

Since the components such as the converters 10 and the drive motors M1, M2 of the drive trains are adapted for a certain rated potential, a voltage divider 40 is integrated in accordance with the disclosure, whereby the use of the drive system is also possible at an overhead line system 30 whose DC voltage $U_{DC}$ exceeds the rated voltages of the inverters 10. Specifically, the DC voltage $U_{DC}$ of the overhead line system 30 tapped via the current collectors 20 is divided by means of the voltage divider 40 arranged at the input side to two partial voltages U1, U2 whose voltage levels are each below the potential $U_{DC}$, ideally both partial voltages each correspond to $U_{DC}/2$. The voltage divider 40 comprises a series connection of the two impedances Z1, Z2, with the partial voltage U1 being applied above the impedance Z1 and the partial voltage U2 above the impedance Z2. Only the reduced partial voltages U1, U2 are now applied at the inverters 10, with the partial voltage U1 being applied at the input of the first inverter of the motor M1 and the partial voltage U2 at the second inverter 10 of the motor M2.

The partial voltages cannot be equal due to the deviations in the impedances Z1 and Z2. To be able to balance the partial voltages, a balancing device 90 is connected to the voltage divider 40. The outgoing partial voltages U1, U2 are balanced by a suitable control of the balancing device 90 by means of the control unit 100.

There is the possibility in ongoing operation to supply the drive motors M1, M2 selectively with energy from the overhead line system 30, the energy store 50, or from both sources 30, 50. The vehicle can thus also bridge certain travel distances outside the overhead line system by energy from the internal energy store 50 and can thus ideally be operated completely free of emissions. Recovered braking energy of the drive motors M1, M2 can be fed back via the bidirectional DC-to-DC converter 60 into the batteries 50 or alternatively via the current collectors 20 into the overhead line system 30. Excess energy can additionally be converted into thermal energy via separate, temporarily engageable braking resistors 70 of the drive trains. The braking resistors 70 can accordingly be dimensioned as small since the braking energy is primarily fed back for the charging of the stores 50 or into the network 30.

The central control device 100 of the drive system of FIG. 1 receives the voltage level $U_{DC}$ of the overhead line system 30, the charge states of the battery banks 50, and the generated partial voltages U1, U2 of the voltage divider 40 as input values. The control unit 100 furthermore receives actual characteristic values of the drive motors M1, M2, inter alia the current motor temperature and the motor speed of the motors M1, M2. The control unit 100 receives the required desired toque M of the drives M1, M2, the desired speed V of the traction drive, and the required desired acceleration a via desired valuators for the control of the drives M1, M2. A current braking demand is furthermore communicated to the control unit 100 via a further desired valuator.

The control unit generates the desired control variables on the basis of the aforesaid input values and controls the two inverters 10 accordingly to generate the desired torque by the motors M1 and M2.

Figure 2:
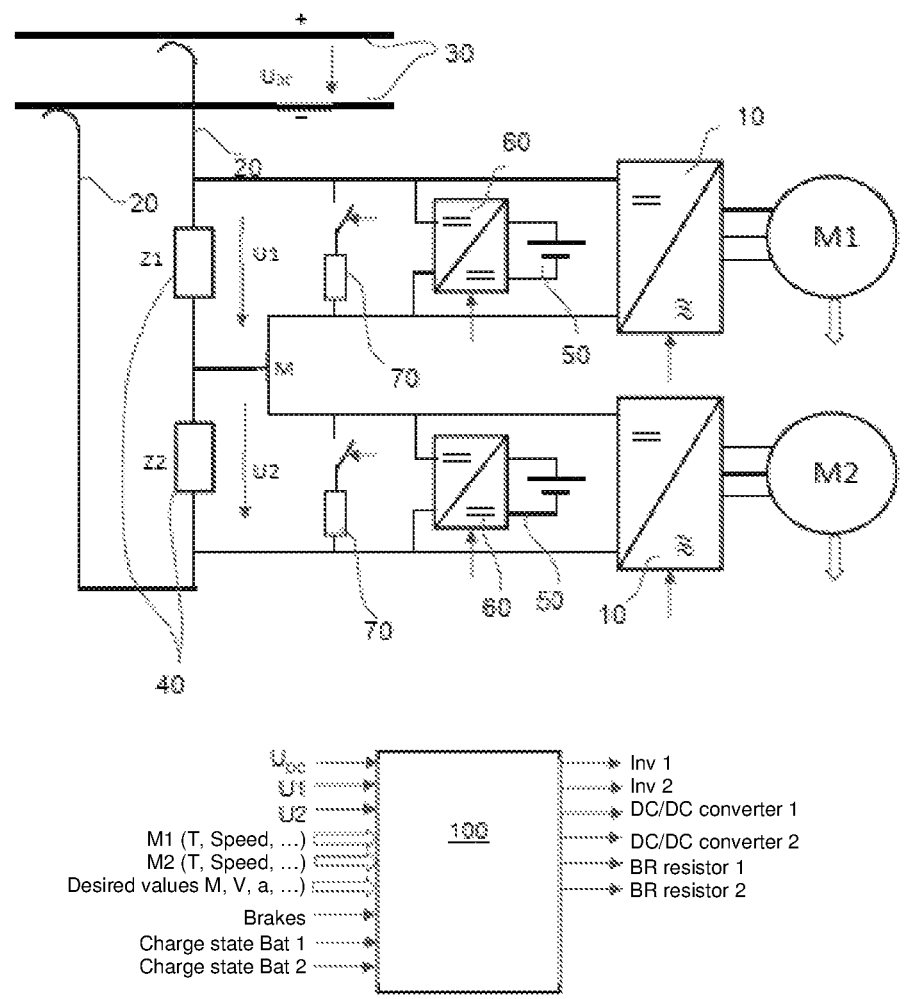
FIG. 2: a modification of the drive system of FIG. 1, but without an additional balancing device in the region of the power supply.

FIG. 2 shows a modification of the drive system of FIG. 1; the same components are marked by identical reference numerals in both Figures. In this embodiment, the DC-to-DC converters 60 can take over the work of the balancing device 90 in accordance with FIG. 1 when the mining truck is connected to overhead lines. A suitable regulation ensures an energy flow of the individual drive trains that sets symmetrical voltage ratios (U1≈U2). The voltage levels in the two drive trains, i.e. the voltage level applied at the inverter, can be regulated independently of one another by the two bidirectional DC-to-DC converters 60 controllable independently of one another. It is thereby possible, for example, to balance asymmetries of the partial voltages U2, U2 in driving operation. The additional balancing device 90 in accordance with FIG. 1 for the balancing of the partial voltages U2, U2 can thus be dispensed with by the suitable control of the DC-to-DC converter 60.

The DC-to-DC converters 60 have to be controlled to charge the stores 50 during the braking process. Excess braking energy is either fed back into the overhead line system 30 or is alternatively removed via the respective activated braking resistor 70.

Figure 3:
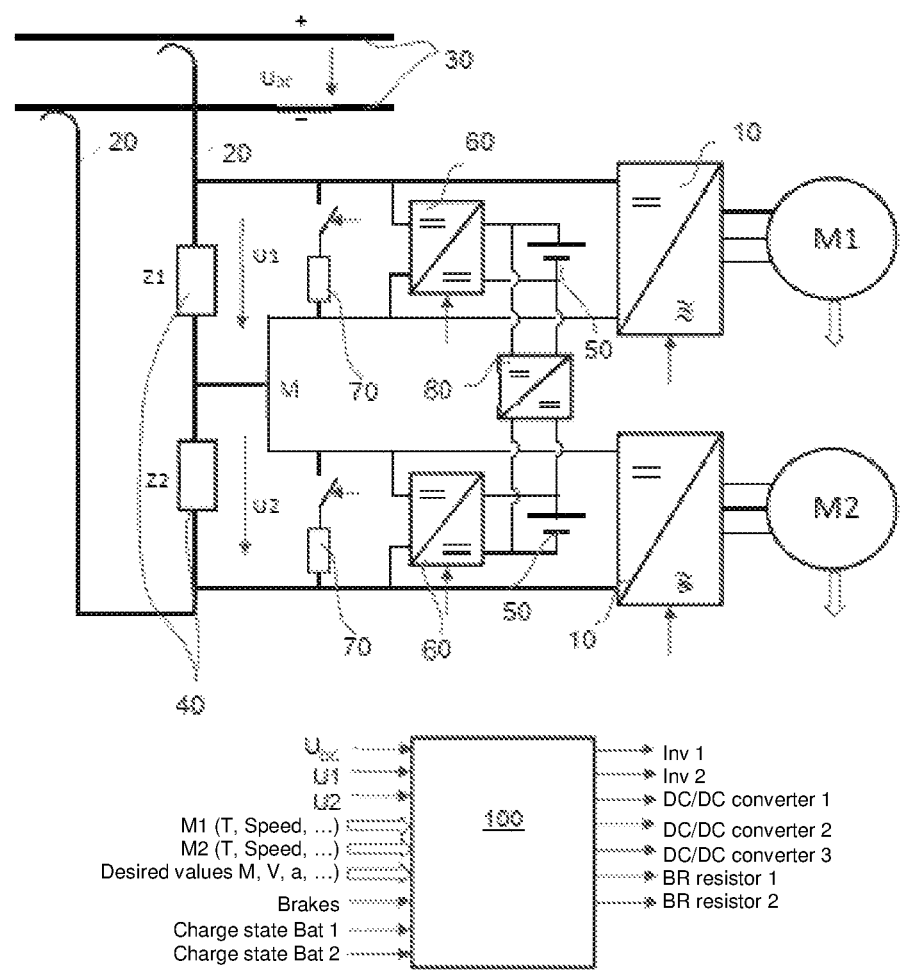
FIG. 3: a further development of the drive system of FIG. 2 with an additional DC-to-DC converter between the two energy stores.

FIG. 3 shows a first further development of the drive system of FIG. 2; the same components are marked by identical reference numerals in both Figures. An additional bidirectional DC-to-DC converter 80 is then installed as a charge balancing means between the two energy stores 50. A charge balance is thereby implemented between the two storage systems 50 when the vehicle is separated from the overhead lines 30 and is only supplied by the batteries 50. In this case, the DC-to-DC converters 60 will set the corresponding voltages U1 and U2; the energy flow (current) results from the load of the individual drive trains. An additional bidirectional DC-to-DC converter 80 therefore has to be used for the balancing of the charges of the battery banks 50 at the left and right, said additional DC-to-DC converter 80 being able to be designed as smaller in power than the two DC-to-DC converters 60. The bidirectional DC-to-DC converter 80 is also suitably controlled by the control unit 100.

Figure 4:
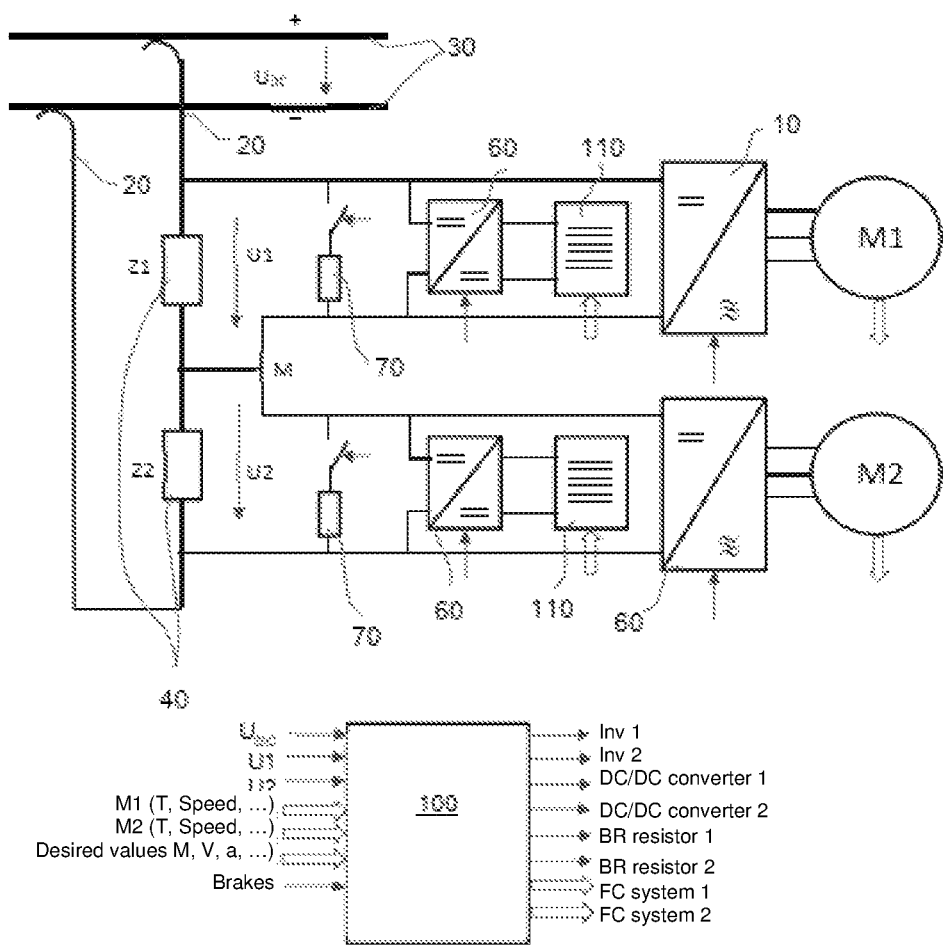
FIG. 4: an alternative embodiment of the system in accordance with FIG. 2 with fuel cells as the internal energy supply system.

In the modification of FIG. 4, a fuel cell system 110 has been installed instead of the battery banks 50 with respect to FIG. 2. The fuel cell system can likewise be controlled by the control unit.

Figure 5:
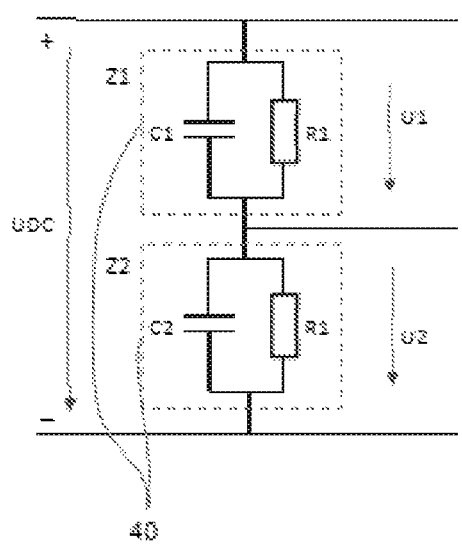
FIG. 5: an exemplary implementation of the voltage divider comprising two impedances.

FIG. 5 shows a possible embodiment of the voltage divider 40 in accordance with FIGS. 1 to 4 that is implemented by two impedances Z1 and Z2. The impedances Z1 and Z2 each may comprise an additional parallel circuit of capacitor C1, C2 and resistor R1, R2.

The individual modifications of FIGS. 1 to 4 are also combinable with one another as desired, i.e. the embodiments of FIGS. 1, 2, and 3 can also be used with fuel cells 110 in accordance with FIG. 4.

The invention claimed is:

1. An electrical drive system for an electrical work machine, having at least two electrical drive motors that can each be regulated independently of one another via an associated inverter, wherein the electrical drive system has a DC voltage power supply for the energy supply of the at least two drive motors,
   wherein
   at least one voltage divider is arranged in parallel with the DC voltage power supply whose partial voltages can be provided at DC voltage inputs of the at least two inverters.

2. A drive system in accordance with claim 1, wherein at least one energy store is provided per drive motor or inverter for the energy supply of respective drive motors and/or for storage of energy recovered from the respective drive motors and/or of energy provided via the DC voltage power supply.

3. A drive system in accordance with claim 2, wherein the drive motor can selectively be supplied with energy via the DC voltage power supply and/or the energy store.

4. A drive system in accordance with claim 2, wherein at least two of the energy stores are each connected to the voltage divider and/or to the associated inverter via a bidirectional DC-to-DC converter.

5. A drive system in accordance with claim 4, wherein the at least two energy stores are connected to one another via a bidirectional DC-to-DC converter for the purpose of a charge exchange between the energy stores.

6. A drive system in accordance with claim 1, wherein the voltage divider comprises a series connection connected in parallel to the DC voltage power supply and composed of at least two impedances, with the DC voltage provided per drive motor being partial voltage tapped over a portion of the impedances, with each impedance comprising a parallel circuit of at least one capacitor and at least one resistor.

7. A drive system in accordance with claim 1, wherein at least one voltage balancing device is provided to balance the partial voltages of the voltage divider at the output side.

8. A drive system in accordance with claim 1, wherein at least one braking resistor is connected in parallel per drive motor.

9. A drive system in accordance with claim 1, wherein the drive system as a DC voltage power supply has at least one current collector for contacting of an overhead line.

10. A drive system in accordance with claim 5, wherein a central drive control is provided that receives a voltage value of a mains voltage and/or the partial voltage values of the voltage divider and/or actual values of the drive motors characteristic for the drive and/or desired values of the drive motors characteristic for the drive and/or a desired braking value as input values and is configured to generate control variables for the inverters and/or the bidirectional DC-to-DC converters and/or charge balancing means and/or the braking resistors on the basis of the received actual values and/or desired values.

11. A drive system in accordance with claim 10, wherein the drive control is further configured to control the DC-to-DC converter such that on an energy supply of the drive motors via the DC voltage power supply, a balancing of the partial voltages generated by the voltage divider is achieved and/or to control the bidirectional DC-to-DC converter such that on a supply of the drive motors via the energy stores, a balancing of the partial voltages provided by the energy stores takes place by an additional charge balance between the energy stores.

12. A work machine, having a drive system in accordance with claim 1 as a traction drive, wherein the drive motors serve the drive of separate wheels.

13. A work machine in accordance with claim 12, wherein the traction drive can selectively be supplied with energy via an overhead line and/or the internal energy stores.

14. A work machine in accordance with claim 12, characterized in that the work machine is emission free.

15. A method of operating the electrical drive system of claim 10, for a work machine having the at least two electrical drive motors that can each be regulated independently of one another via an associated inverter,
   wherein
   a mains voltage obtained via the DC voltage power supply is divided, and partial voltages of the mains voltage are provided at the DC voltage inputs of the at least two inverters.

16. The drive system in accordance with claim 2 wherein the energy store is one or more of a battery bank and a fuel cell stack having a fuel cell container.

* * * * *